United States Patent
Yoo et al.

(10) Patent No.: US 10,429,031 B2
(45) Date of Patent: Oct. 1, 2019

(54) LINEAR LED MODULE AND BACKLIGHT UNIT INCLUDING THE SAME

(71) Applicant: LUMENS CO., LTD., Yongin-si, Gyeonggi-do (KR)

(72) Inventors: TaeKyung Yoo, Yongin-si (KR); SeungHyun Oh, Yongin-si (KR); SungSik Jo, Yongin-si (KR); SeungHoon Lee, Yongin-si (KR)

(73) Assignee: LUMENS CO., LTD., Yongin-si (KR)

( * ) Notice: Subject to any disclaimer, the term of this patent is extended or adjusted under 35 U.S.C. 154(b) by 22 days.

(21) Appl. No.: 15/598,285

(22) Filed: May 17, 2017

(65) Prior Publication Data
US 2017/0350572 A1 Dec. 7, 2017

(30) Foreign Application Priority Data

Jun. 7, 2016 (KR) .................. 10-2016-0070256
Jun. 13, 2016 (KR) .................. 10-2016-0073273

(51) Int. Cl.
| | | |
|---|---|---|
| *F21V 7/00* | (2006.01) | |
| *F21V 7/04* | (2006.01) | |
| *G02F 1/1335* | (2006.01) | |
| *F21Y 103/10* | (2016.01) | |
| *F21Y 115/10* | (2016.01) | |

(52) U.S. Cl.
CPC .......... *F21V 7/0008* (2013.01); *F21V 7/0041* (2013.01); *F21V 7/04* (2013.01); *G02F 1/133615* (2013.01); *F21Y 2103/10* (2016.08); *F21Y 2115/10* (2016.08)

(58) Field of Classification Search
None
See application file for complete search history.

(56) References Cited

U.S. PATENT DOCUMENTS

| 4,814,667 A * | 3/1989 | Tanaka .................. B41J 2/45 250/578.1 |
| 6,257,737 B1 * | 7/2001 | Marshall ................ F21S 8/04 362/231 |

(Continued)

FOREIGN PATENT DOCUMENTS

| JP | 2002075038 A | 3/2002 |
| JP | 2004342472 A | 12/2004 |

(Continued)

*Primary Examiner* — Christle I Marshall
(74) *Attorney, Agent, or Firm* — Mei & Mark LLP (57) ABSTRACT

The present disclosure discloses a linear LED module including: at least one LED bar including multiple LEDs arrayed on a substrate in a lengthwise direction of the substrate; a mounting portion in which the at least one LED bar is mounted on its mounting surface in the lengthwise direction; and a composite reflective portion integrated with the mounting portion and adapted to reflect light emitted from the at least one LED bar. A cross-section of the composite reflective portion includes a curved reflective surface adjacent to the mounting portion and a straight reflective surface extending away from a boundary with the mounting portion. Also disclosed is a backlight unit including the linear LED module. The backlight unit includes a rear case arranged in rear of a display panel, a reflective sheet positioned in rear of the display panel in the rear case, and a linear LED module.

9 Claims, 7 Drawing Sheets

(56) References Cited

U.S. PATENT DOCUMENTS

| | | | |
|---|---|---|---|
| 8,579,473 B2 * | 11/2013 | Holten | F21V 7/0008 362/341 |
| 8,915,610 B2 * | 12/2014 | Fujita | F21S 8/02 362/227 |
| 9,752,753 B2 * | 9/2017 | Kim | F21V 7/00 |
| 2009/0213571 A1 | 8/2009 | Jin et al. | |
| 2012/0008067 A1 * | 1/2012 | Mun | G02B 6/003 349/65 |
| 2013/0242541 A1 * | 9/2013 | Kim | F21V 7/00 362/97.1 |

FOREIGN PATENT DOCUMENTS

| | | | |
|---|---|---|---|
| JP | 2005032575 A | 2/2005 | |
| JP | 2006106212 A | 4/2006 | |
| JP | 2007294372 A | 11/2007 | |
| JP | 2010086816 A | 4/2010 | |
| JP | 2010528444 A | 8/2010 | |
| JP | 2011509500 A | 3/2011 | |
| JP | 2011523177 A | 8/2011 | |
| JP | 2012074308 A | 4/2012 | |
| JP | 2012124136 A | 6/2012 | |
| JP | 2013143350 A | 7/2013 | |
| JP | 2014106526 A | 6/2014 | |
| JP | WO2013094480 A1 | 4/2015 | |
| JP | 2016062838 A | 4/2016 | |
| JP | WO2014087723 A1 | 1/2017 | |
| KR | 20090010548 A | 1/2009 | |
| KR | 100948115 B1 | 3/2010 | |
| KR | 20120134828 A | 12/2012 | |
| WO | WO2010001604 A1 | 1/2010 | |
| WO | WO2011158523 A1 | 12/2011 | |
| WO | WO2013077240 A1 | 5/2013 | |

\* cited by examiner

LINEAR LED MODULE AND BACKLIGHT UNIT INCLUDING THE SAME

CROSS-REFERENCE TO RELATED APPLICATION(S)

This application claims the benefit of priority of the prior Korean Patent Application Nos. 10-2016-0070256, filed Jun. 7, 2016 and 10-2016-0073273, filed Jun. 13, 2016, the entire contents of which are incorporated herein by reference.

BACKGROUND

1. Field of the Invention

The present invention relates to a linear light emitting diode (LED) module including a linear reflector and a linear LED bar and a backlight unit including the linear LED module without the need for a light guide plate.

2. Description of the Related Art

Backlight units are used in a wide range of applications, for example, LED TVs. Backlight units are broadly classified into edge-type backlight units and direct-type backlight units depending on the arrangement of light sources. In edge-type backlight units, a light guide plate (LGP) is arranged in rear of a display panel and LEDs are arranged at one lateral side of the light guide plate.

Conventional direct-type backlight units use a number of LEDs, whereas edge-type backlight units are advantageous in that the number of LEDs can be remarkably reduced. Nevertheless, direct-type backlight units have again attracted increasing attention due to high brightness of LEDs, low price of LEDs, and no need for expensive light guide plates. Direct-type backlight units are currently being developed that use a reduced number of LEDs to achieve a good distribution of light compared to conventional direct-type backlight units.

Direct-type backlight units are required to have a sufficient height because a sufficient distance between a display panel and light sources should be ensured. A lens may be used to widen a viewing angle of each LED, which is contrary to consumers' preferences for thin display devices, such as slim TVs. For these reasons, demand for edge-type backlight units is expected to rise steadily in the future.

Under these circumstances, there exists a need in the art for backlight units that can avoid the use of expensive light guide plates while maintaining advantages of edge-type backlight units that can contribute to a considerable reduction in a thickness of display devices. In order to meet this need, it is necessary to develop a technique by which light emitted from LEDs arranged at a rear edge of a display panel rather than in an area under a display panel is delivered to a reflective sheet positioned in rear of the display panel without the need to use a light guide plate. To this end, a reflector is used that serves to widely deliver light emitted from LEDs over the entire area of the reflective sheet.

In this technique, the reflective sheet may be provided with a slope or a gradient such that light delivered from the reflector is more uniformly reflected forward. The reflective sheet may be arranged such that its height is relatively small in areas adjacent to the LEDs and the reflector and gradually increases with an increasing distance from the LEDs and the reflector. The reflector is required to evenly deliver light emitted from the LEDs from the neighboring area to the distant area. However, a considerable portion of light emitted from the LEDs is not reflected from the reflector and reaches an edge area of the reflective sheet. That is, the reflector fails to evenly distribute light in the existing technology.

Other problems are that a printed circuit board (PCB) is difficult to bond to the reflector and the stability and reliability of the bonding are not sufficient. Further, overlapping of light emitted from the neighboring LEDs in LED arrays may cause non-uniform distribution of light. In the case where the distances between the LEDs increase to solve one or more of the problems caused by overlapping of light emitted from the neighboring LEDs, areas lacking supply of light are intermittently found over an entire surface of the display panel, making the problem of non-uniform light distribution more serious. Another problem exists in that non-uniform light distribution is caused by relatively bright areas around the edges of the display panel.

SUMMARY

The present invention has been made in an effort to solve at least one or more of the problems described above. In an aspect of the present disclosure, a linear LED module is provided, which uses a linear reflector to widely distribute light emitted from a linear LED bar.

Further, a backlight unit is constructed such that light emitted from LEDs arranged adjacent to one side edge of a reflective sheet positioned in rear of a display panel can be evenly distributed over an entire surface of the display panel without the need for a light guide plate.

A linear LED module according to one aspect of the present invention includes: at least one LED bar including a plurality of LEDs arrayed on a substrate in a lengthwise direction of the substrate; a mounting portion including a mounting surface and in which the LED bar is mounted on the mounting surface in the lengthwise direction; and a composite reflective portion integrated with the mounting portion and adapted to reflect light emitted from the LED bar wherein the cross-section of the composite reflective portion includes a curved reflective surface adjacent to the mounting portion and a straight reflective surface extending away from the boundary with the mounting portion.

According to one embodiment, the LED bar mounted on the mounting surface is arranged adjacent to the curved reflective surface.

According to one embodiment, a slope of the curved reflective surface relative to the mounting surface gradually decreases from a boundary with the mounting surface to the boundary with the straight reflective surface.

According to one embodiment, the mounting portion and the composite reflective portion are made in one piece by molding to form a reflector and the reflector includes a mechanism made by pultrusion or extrusion molding of a metal.

According to one embodiment, the plurality of LEDs include LEDs arranged adjacent to each other at first intervals and LEDs arranged adjacent to each other at second intervals smaller than the first intervals along the lengthwise direction and the LEDs arranged adjacent to each other at the first intervals are positioned closer to one end of the mounting portion than the LEDs arranged adjacent to each other at the second intervals.

According to one embodiment, the plurality of LEDs includes LEDs in a first LED array and LEDs in a second LED array arranged along two imaginary straight lines parallel to each other and are arranged in a zigzag configuration along the lengthwise direction such that the intervals between the neighboring LEDs in the first and second LED arrays increase.

According to one embodiment, the straight reflective surface is inclined at an acute angle relative to the mounting surface.

According to one embodiment, the slope of the straight reflective surface relative to the mounting surface is adjusted to have an angle of 40° to 60°.

According to one embodiment, lateral corners of the neighboring LEDs face each other.

According to one embodiment, 70% to 90% of light reaching the composite reflective portion is reflected from the curved reflective surface and 10% to 30% of the light is reflected from the straight reflective surface.

A backlight unit according to a further aspect of the present invention includes a rear case arranged in rear of a display panel, a reflective sheet positioned in rear of the display panel in the rear case, and a linear LED module including at least one LED bar and a linear reflector and arranged along one side edge of the reflective sheet wherein the linear reflector includes a mounting portion on which the LED bar is mounted along the lengthwise direction and a composite reflective portion integrated with the mounting portion and adapted to primarily reflect light emitted from the LED bar toward the reflective sheet and wherein the reflective sheet is adapted to secondarily reflect the light primarily reflected from the composite reflective portion toward the display panel.

According to one embodiment, the reflective sheet includes a base portion having the lowest height in a widthwise direction and a first reflective area whose height gradually decreases along the widthwise direction from its one side edge adjacent to the linear LED module to the base portion.

According to one embodiment, the reflective sheet includes a base portion having the lowest height in the widthwise direction and a second reflective area whose height gradually increases along the widthwise direction from the base portion to the other side edge distant from the linear LED module.

According to one embodiment, the second reflective area is formed as a reflective surface having a continuous curved profile with a positive (+) gradient.

According to one embodiment, the reflective sheet includes a base portion having the lowest height in the widthwise direction, a first reflective area whose height gradually decreases along the widthwise direction from its one side edge adjacent to the linear LED module to the base portion, and a second reflective area whose height gradually increases along the widthwise direction from the base portion to the other side edge distant from the linear LED module wherein the first reflective area is formed as a reflective surface having a continuous curved profile with a negative (−) gradient and the second reflective area is formed as a reflective surface having a continuous curved profile with a positive (+) gradient.

According to one embodiment, the second reflective area has a width larger than that of the first reflective area.

According to one embodiment, the reflective sheet includes one or more light attenuating areas formed around its one side edge adjacent to the linear LED module to increase the amount of light absorbed and reduce the amount of light reflected.

According to one embodiment, the one or more light attenuating areas include a first light attenuating area elongated along one side edge of the reflective sheet adjacent to the linear LED module and second and third light attenuating areas formed adjacent to the linear LED module at both sides of the reflective sheet in the widthwise direction.

According to one embodiment, one or more light diffusion patterns are formed in a central portion of the reflective sheet.

According to one embodiment, the backlight unit further includes a fixing clip provided on one side wall of the rear case and having a fitting groove in which the mounting portion is elastically fitted and held.

The backlight unit of the present invention has an advantage, among many others, in that light emitted from LEDs arranged adjacent to one edge of a display panel rather than in an area under a display panel can be substantially evenly distributed to the display panel without the need for a light guide plate. In addition, the linear LED module of the present invention includes a printed circuit board (PCB) and a reflector that are easy to bond with good stability and reliability. Furthermore, among many others, the present invention provides a solution to the problem of non-uniform distribution of light caused by overlapping of light emitted from neighboring LEDs in LED arrays. The present invention also provides a solution to the problem of non-uniform distribution of light caused by relatively bright areas around the edges of a display panel.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Preferred embodiments of the present invention will now be described with reference to the accompanying drawings.

Figure 1:
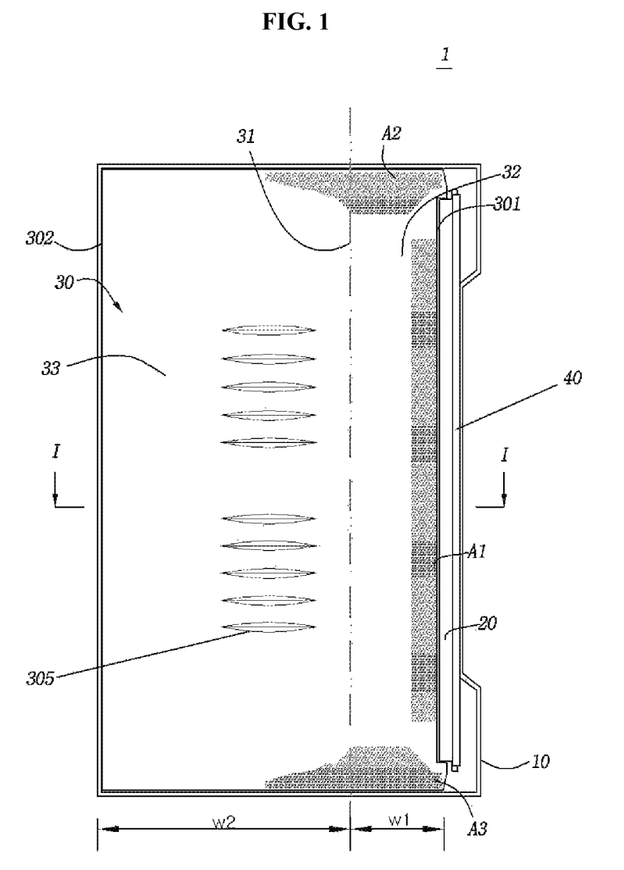
FIG. 1 is a plan view of a backlight unit.
Figure 2:
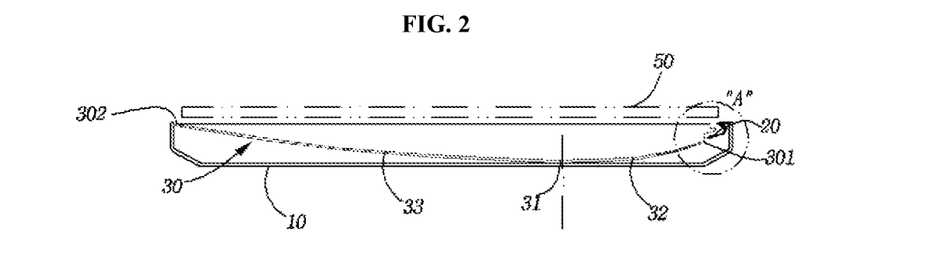
FIG. 2 is a cross-sectional view taken along line I-I of FIG. 1 in which a diffusion sheet is indicated by an imaginary line.
Figure 3:
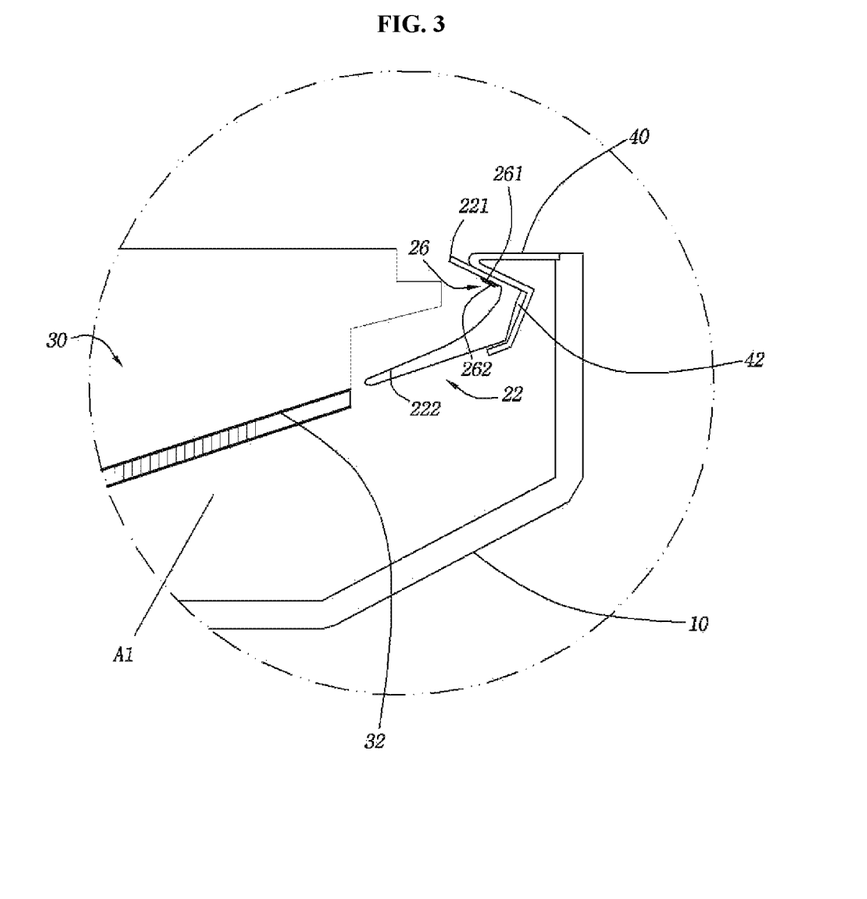
FIG. 3 is an enlarged cross-sectional view of a circle "A" of FIG. 2.

FIGS. 1 to 3 illustrate a backlight unit 1 according to one embodiment of the present invention. The backlight unit 1 is arranged adjacent to one inner side wall of a rear case 10 to supply light to a display panel, for example, a LCD panel (not illustrated). Although not illustrated, a diffusion sheet and a display panel are arranged above the backlight unit 1.

The backlight unit 1 includes at least one linear LED module 20 linearly arranged along one side wall of the rear case 10 and a reflective sheet 30 adapted to uniformly and widely reflect light emitted downward from the linear LED module 20 toward the overlying diffusion sheet 50 and display panel (not illustrated).

The linear LED module 20 is arranged adjacent to one side edge 301 of the reflective sheet 30 and the diffusion sheet 50 is arranged above the reflective sheet 30. A considerable proportion of light emitted from the linear LED module 20 propagates backward at various angles toward the reflective sheet 30 and the remaining proportion of the light emitted from the linear LED module 20 propagates forward toward the overlying (i.e. front) diffusion sheet 50 and the display panel.

As will be explained below, despite the presence of the linear LED module 20 including a structure of a linear reflector 22 adapted to widely distribute light, which is an important feature of the present invention, most of the light emitted from the linear LED module 20 would be focused on the edges of the display panel if the reflective sheet 30 including features of the present invention, which will be explained in more detail, is not provided.

The reflective sheet 30 is arranged below the display panel and the underlying diffusion sheet and is positioned adjacent to the linear LED module 20 at one side edge thereof in the widthwise direction.

The reflective sheet 30 includes a base portion 31 having the lowest height in the widthwise direction. The base portion 31 refers to a portion whose height is lower than those of the other reflective surface portions of the reflective sheet 30. In FIGS. 1 and 2, the position of the base portion 31 is indicated by alternate long and two short dashes lines.

The reflective sheet 30 includes a first reflective area 32 with a negative (−) gradient in which the height gradually decreases along the widthwise direction from the side edge 301 adjacent to the linear LED module 20 to the base portion 31 and a second reflective area 33 with a positive (+) gradient in which the height gradually increases along the widthwise direction from the base portion 31 to the other side edge 302 distant from the linear LED module 20.

Each of the first reflective area 32 and the second reflective area 33 is formed as a reflective surface having a continuous curved profile. The base portion 31 is biased toward the linear LED module 20 with respect to the widthwise center of the reflective sheet 30. Thus, the width w2 of the second reflective area 32 is about 2-3 times larger than the width w1 of the first reflective area 33.

In comparison with an imaginary horizontal reflective surface, the reflective surface of the second reflective area 33 is inclined such that the angles of incidence and reflection of light supplied from the linear LED module 20 are reduced. Due to this inclination, the second reflective area 33 can concentrate light on the overlying diffusion sheet 50 and display panel.

The reflective surface of the first reflective area 32 can reflect a relatively large amount of light at the edge area adjacent to the linear LED module 20 as far as possible, and as a result, non-uniformity of the light is reduced. In comparison with an imaginary horizontal reflective surface, the reflective surface of the first reflective area 32 is inclined such that the angles of incidence and reflection of light increase. Due to this inclination, the amounts of light reaching areas of the diffusion sheet 50 and the display panel distant from the linear LED module 20 increase and the amounts of light reaching areas of the diffusion sheet 50 and the display panel adjacent to the linear LED module 20 decrease.

As best illustrated in FIG. 1, the reflective sheet 30 includes a plurality of light attenuating areas A1, A2, and A3 (hereinafter, referred to as first, second, and third light attenuating areas, respectively) adapted to increase the amount of light absorbed and reduce the amount of light reflected around one side edge adjacent to the linear LED module 20. Each of the light attenuating areas A1, A2, and A3 is at least partially formed over the first reflective area 32 adjacent to the linear LED module 20. In this embodiment, the first light attenuating area A1 is elongated along the side edge 301 of the reflective sheet 30 adjacent to the linear LED module 20. The second and third light attenuating areas A2 and A3 are formed adjacent to the linear LED module at both sides of the reflective sheet in the widthwise direction and have relatively large areas over the first reflect area 32.

The first light attenuating area A1 partially absorbs and attenuates light emitted throughout most of the length of the linear LED module 20 and reaching an area of the reflective sheet adjacent to the linear LED module 20. The second and third light attenuating areas A2 and A3 also attenuate the amount of light emitted from the linear LED module 20 and reflected from the sides of the rear case 10 adjacent to the reflective sheet. For light absorption, a number of holes or black dot patterns may be formed sectionwise in the light attenuating areas A1, A2, and A3.

A plurality of light diffusion patterns 305 are formed in the central portion of the reflective sheet 30. The plurality of light diffusion patterns 305 widely scatter light focused on the central portion of the reflective sheet 30 in the lengthwise direction. The plurality of light diffusion patterns 305 are elongated in a direction corresponding to the widthwise direction of the reflective sheet 30 and are arranged along the lengthwise direction in the widthwise central portion of the reflective surface of the reflective sheet 30. Each of the light diffusion patterns 305 has a V-shaped cross-section, which allows the light diffusion pattern 305 to widely scatter light or to send light to an area opposite the linear LED module 20 in the lengthwise direction.

As explained previously, the first reflective area 32 receives light at a large angle of incidence from the linear LED module 20 and reflects the light at a large angle of incidence toward the diffusion sheet 50 distantly from the linear LED module 20. At this time, the first reflective area 32 reduces the relatively large amount of light reaching an area close to the linear LED module 20 and increases the amount of light reaching an area distant from the linear LED module 20. The second reflective area 33 reduces the angles of incidence and reflection of light reaching from the linear LED module 20 to focus the light on the diffusion sheet 50 provided directly on the reflective sheet.

Figure 4:
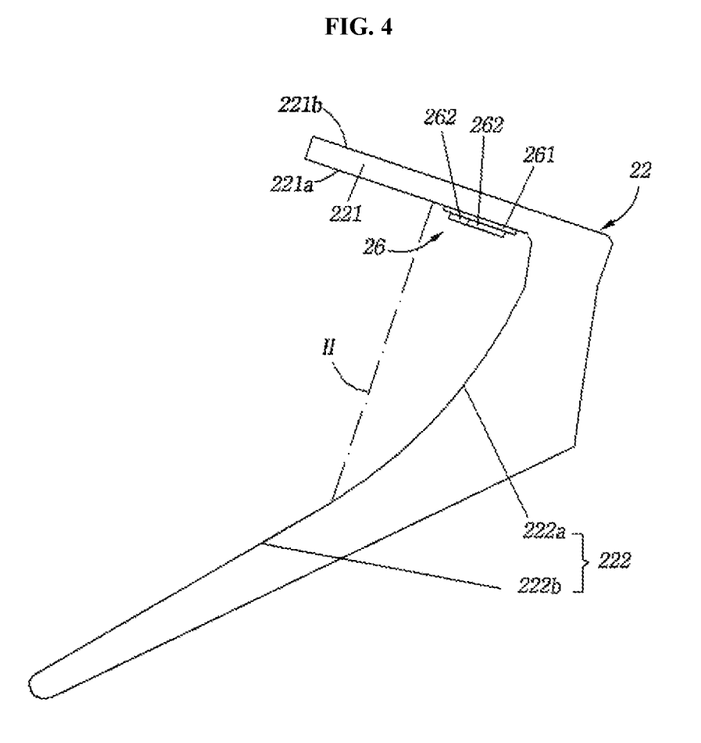
FIG. 4 is a cross-sectional view illustrating a linear LED module.
Figure 5:
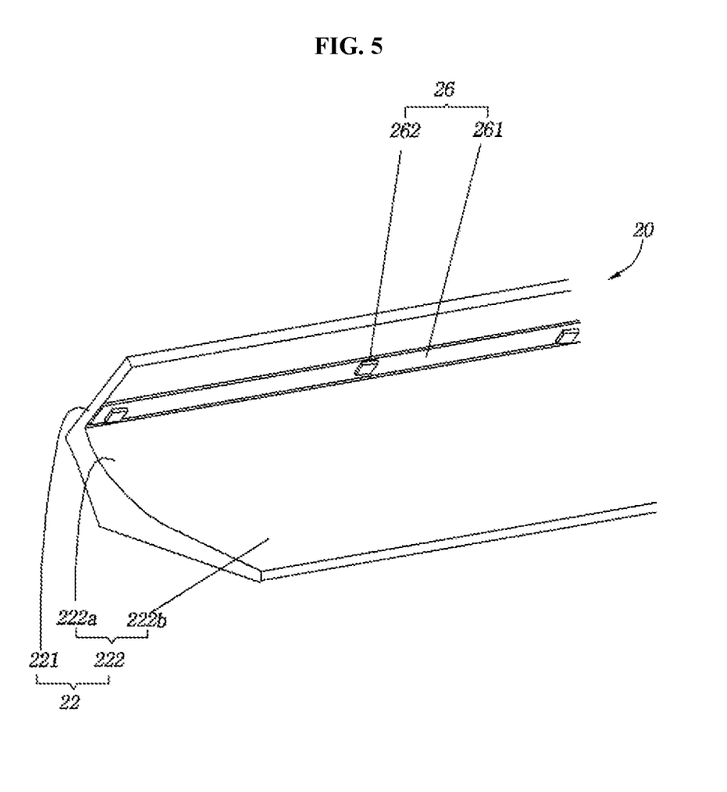
FIG. 5 is a perspective view illustrating a linear LED module.
Figure 6:
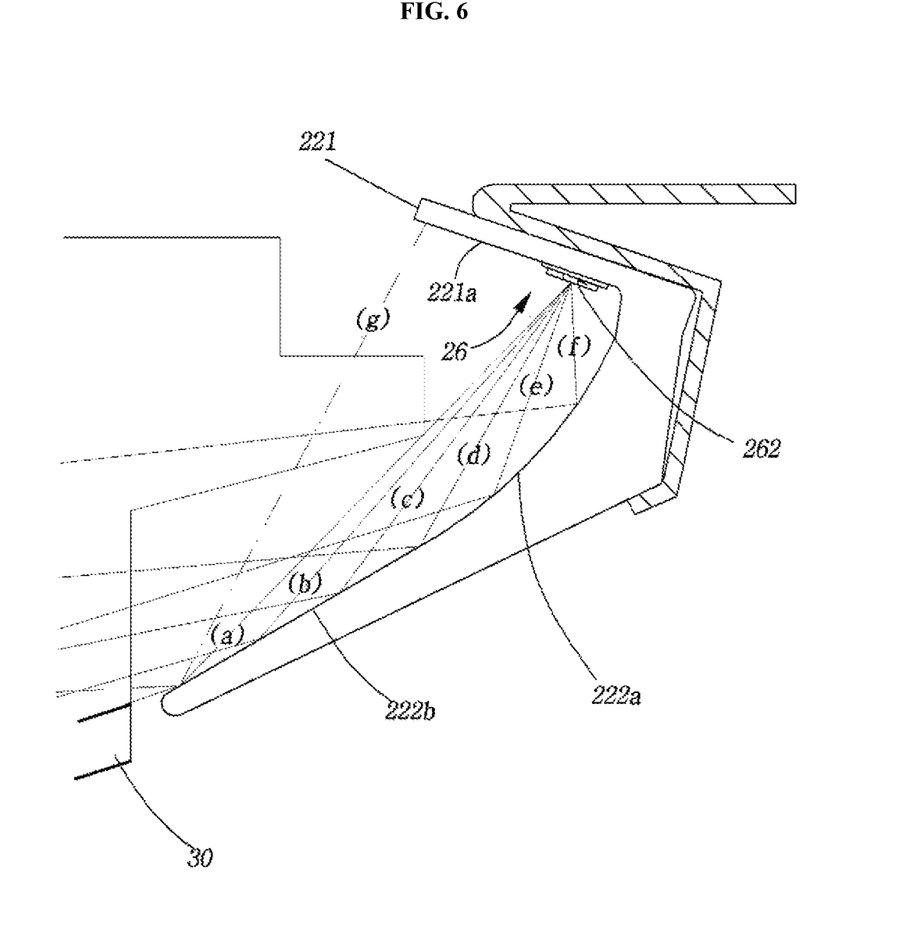
FIG. 6 is a view for explaining the function of a linear LED module.

As illustrated in FIGS. 4 to 6, the linear LED module 20 includes a linear LED bar 26 and a linear reflector 22 adapted to reflect light emitted from LEDs 262 of the linear LED bar 26.

The linear reflector 22 is made by pultrusion or extrusion molding of a highly reflective metal material and includes a mounting portion 221 and a composite reflective portion 222 disposed at an approximately acute angle relative to the mounting portion 221 and integrated with the mounting portion 221. The cross-sectional shapes of the mounting portion 221 and the composite reflective portion 222 are determined by the shape of a mold used for the pultrusion or extrusion molding.

The linear LED bar 26 is inclined downward at a predetermined angle. The slope of the linear LED bar 26 is determined by an angle at which the mounting portion 221 is elastically fitted into and held in a fixing clip 40 (see FIGS. 1-3) fixedly mounted at an upper end of one side wall of the rear case 10 (see FIGS. 1-3).

More specifically, the cross-section of the mounting portion 221 includes a mounting surface 221a on which the linear LED bar 26 is mounted and an opposite surface 221b parallel to the mounting surface 221a. When the mounting portion 221 is elastically fitted and held in the fixing clip 40 (see FIGS. 1-3), the opposite surface 221b is held in contact with an inclined surface of a fitting groove 42 (see FIG. 3) formed in the fixing clip 40 (see FIGS. 1 and 3). The inclined surface is formed corresponding to the opposite surface 221b. The slope of the linear LED bar 26 can be determined by the contact angle with the inclined surface.

The LED bar 26 may be mounted in plurality on the mounting surface 221a. In this case, it is preferable that the plurality of LED bars 26 are arranged in line along the lengthwise direction.

It is preferable that the mounting surface 221a of the mounting portion 221 is disposed above one side edge of the reflective sheet 30 and is inclined toward the reflective sheet 30. This allows the linear LED bar 26 to be inclined toward the reflective sheet 30.

When viewed from its cross-section, the composite reflective portion 222 includes a curved reflective surface 222a formed adjacent to the mounting surface 221a and a straight reflective surface 222b extending a distance from the boundary with the curved reflective surface 222a in the direction away from the mounting portion 221. The curved reflective surface 222a forms a continuous curve starting from a position adjacent to the mounting surface 221a and ending at the boundary with the straight reflective surface 222b. The curved reflective surface 222a reflects the largest amount of light emitted from the linear LED bar 26.

The slope of the straight reflective surface 222b relative to the mounting surface 221a is always constant at an angle of approximately 40 to 60°. The slope of the curved reflective surface 222a relative to the mounting surface 221a is typically 90° or less and gradually decreases from the starting position of the curved reflective surface 222a to the position where the curved reflective surface 222a meets the straight reflective surface 222b.

The linear LED bar 26 is mounted on the mounting surface 221a of the mounting portion 221 so as to be close to the starting position of the composite reflective portion 222, i.e. the boundary between the mounting surface 221a and the curved reflective surface 222a. More specifically, the linear LED bar 26 lies in the area close to the curved reflective surface 222a of the composite reflective portion 222 with respect to a line H drawn perpendicular to the mounting surface 221a from the boundary between the curved reflective surface 222a and the straight reflective surface 222b of the composite reflective portion 222.

When the LEDs 262 of the linear LED bar 26 mounted on the mounting surface 221a are positioned close to the boundary with the curved reflective surface 222a, the angles of incidence and reflection relative to the curved reflective surface 222a and the straight reflective surface 222b increase, and as a result, upward reflection of light from the composite reflective portion 222 can be suppressed as much as possible and the reflected light can be sent as far as possible.

The LEDs 262 are placed above one side edge of the reflective sheet 30 and the composite reflective portion 222 serves to uniformly reflect light emitted from the LEDs 262 toward the reflective sheet 30. Accordingly, if most of the light reflected from the composite reflective portion 222 is directed upward rather than downward, the light is difficult to uniformly distribute.

As illustrated, a large amount of light can be widely reflected downward by minimizing the distance between the LEDs 262 provided in the linear LED bar 26 and the curved reflective surface 222a in an allowable range.

The curved reflective surface 222a widely reflects light emitted from the linear LED bar 26 in the downward direction. Particularly, light is reflected away with decreasing distance from the linear LED bar 26 in the zone of the curved reflective surface 222a whose slope gradually decreases and in the zone of the straight reflective surface 222b.

When light emitted from the LEDs 262 reaches a position closer to the tip of the straight reflective surface 222b in a state in which the LEDs 262 are arranged closest to the curved reflective surface 222a, the light is directed toward one side edge of the reflective sheet 30 (see FIGS. 1 and 3) closer to the tip of the composite reflective portion 222.

Most of the light emitted from the linear LED bar 26 reaches the curved reflective surface 222a of the composite reflective portion 222. It is preferable that the amount of light emitted from the linear LED bar 26 and reaching the curved reflective surface 222a is 3 to 5 times larger than that of light reaching the straight reflective surface 222b.

In this embodiment, around 80% (70-90%) of light emitted from the linear LED bar 26 reaches the curved reflective surface 222a of the composite reflective portion 222. The curved reflective surface 222a serves to widely and uniformly reflect a large amount of light in the forward direction.

The curved reflective surface 222a is relatively close to the optical axis of the LEDs 262 and is useful in widely reflecting a large amount of light in the downward direction a predetermined distance away from the tip of the composite reflective portion 222. However, the curved reflective surface 222a is limited in reflecting light emitted at a relatively large angle away from the optical axis of the LEDs 262.

In this connection, 20% (10-30%) of light emitted from the linear LED bar 26 at a large angle relative to the optical axis of the LEDs 262 reaches the straight reflective surface 222b of the composite reflective portion 222. The straight reflective surface 222b serves to reflect incident light such that the light is widely dispersed from an area adjacent to the tip of the composite reflective portion 222 to an area distant from the tip of the composite reflective portion 222.

Particularly, the straight reflective surface 222b reflects light away when the point of incidence or reflection is close to the boundary with the curved reflective surface 222a. as the distance to the boundary with the curved reflective surface 222a increases, the density of light directed toward an area of the reflective sheet adjacent to the composite reflective portion 222 decreases. This reduces the problems of a relatively excessive amount of light in areas adjacent to LEDs and the resulting light non-uniformity.

Figure 7:
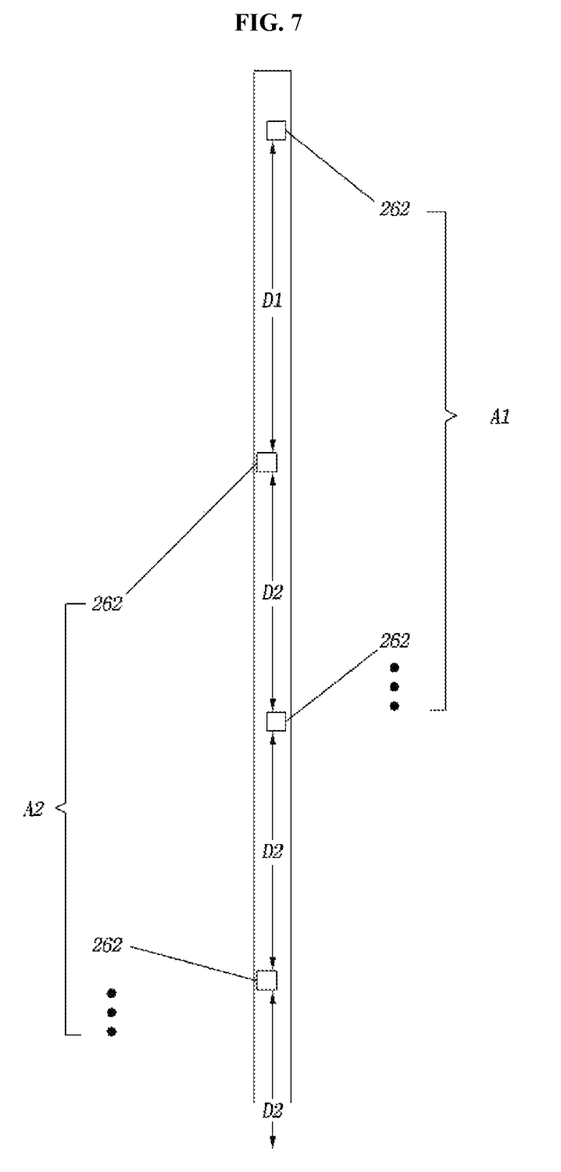
FIG. 7 is a view for explaining arrays of LEDs provided in a linear LED module.

As illustrated in FIGS. 6 and 7, the linear LED bar 26 is mounted on the mounting surface 221a of the mounting portion 221. The linear LED bar 26 includes a bar-type PCB 261 downwardly inclined toward the reflective sheet 30. The plurality of LEDs 262 of the linear LED bar 26 are arranged in a zigzag configuration along the lengthwise direction of the bar-type PCB 261. The PCB 261 includes a prepreg.

The plurality of LEDs 262 may be arranged at different intervals, i.e. first D1 and second intervals D2. The first intervals D1 refer to distances between the LEDs 262 positioned adjacent to one end of the mounting portion 221 and the second intervals D2 refer to distances between the adjacent ones 262 of the remaining LEDs 262 positioned in the middle of the mounting portion 221. It is preferable that the first intervals D1 are larger than the second intervals D2. When the linear LED module 20 is provided in a case of a display device or a lighting device, one end of the mounting portion 221 are placed adjacent to the inner side of the case, resulting in an increase in the amount of light at positions adjacent to the inner side of the case. As described before, the first intervals D1 larger than the second intervals D2 can relatively reduce the amount of light at positions adjacent to the inner side of the case.

The linear LED bar 26 includes a first LED array A1 and a second LED array A2 along respective imaginary straight lines. The plurality of LEDs 262 in the first LED array A1 are arranged in line along one imaginary straight line on the bar-type PCB 261 and the plurality of LEDs 262 in the second LED array A2 are arranged in line along the other imaginary straight line on the bar-type PCB 261.

Thus, overlapping of light emitted from the LEDs 262 in the first LED array A1 can be minimized due to the sufficient intervals between the LEDs 262 and overlapping of light emitted from the LEDs 262 in the second LED array A2 can also be minimized due to the sufficient intervals between the LEDs 262.

No substantial overlapping of light may occur between the LEDs 262 relatively close to each other in the first A1 and second LED arrays A2. The LEDs 262 are arranged in a zigzag configuration on the bar-type PCB 261. With this arrangement, the distances between the LEDs 262 in the first LED array A1 and the neighboring LEDs 262 in the second LED array A2 increase such that overlapping of light is suppressed or reduced.

The zigzag configuration of the LEDs can minimize the occurrence of light non-uniformity caused by overlapping of light, unlike a linear arrangement of LEDs.

Figure 8:
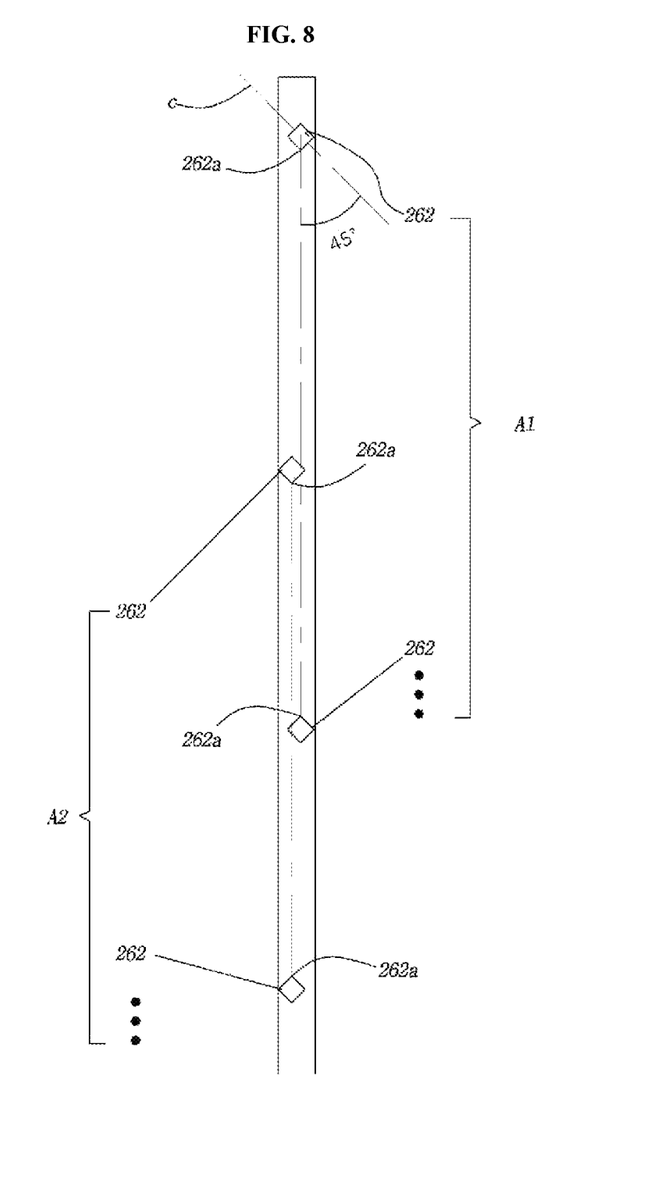
FIG. 8 is a view for explaining another embodiment of LED arrays including LEDs whose lateral edges face each other.

In this embodiment, the two neighboring LEDs in the corresponding LED array have sides facing parallel to each other. Alternatively, the LEDs illustrated in FIG. 7 may be turned by 45°, as illustrated in FIG. 8. In this case, the central line c of each LED 262 and the lengthwise direction of the corresponding LED array meet at an angle of 45°. As used herein, the term "central line c of each LED" is defined as a line parallel to the two facing sides of the LED and passing through the centers of the two sides.

When the central line c of each LED 262 and the lengthwise direction of the corresponding LED array meet at an angle of 45°, the neighboring LEDs 262 in the LED array may be arranged such that the lateral corners 262a face each other. That is, in the linear LED bar 26 illustrated in FIG. 8, the lateral corners 262a of the neighboring LEDs 262 in both the first A1 and second LED arrays A2 face each other.

A simulation test was conducted to determine the amounts of light reaching the zones of the reflector of the LED module according to this embodiment. As a result, it was confirmed that 81.46% of light emitted from the linear LED bar reached a zone corresponding to the curved reflective surface of the composite reflective portion and 18.53% of the light reached a zone corresponding to the straight reflective surface of the composite reflective portion.

Referring again to FIGS. 1 to 6, at the time of manufacture of the reflector 22, plating or sputtering can be applied to the surface of the linear reflector 22 to improve the reflectance of the reflective surface from which light emitted from the LEDs 262 of the linear LED bar 26 is reflected. For example, under plating may be carried out to minimize the roughness of the reflective surface. Most preferably, a mechanism for the reflector 22 is made by pultrusion or extrusion molding of a metal, anodized, primarily plated, plated with highly reflective Ag/Al, and secondarily coated.

In a state in which the linear LED bar 26 is mounted on the mounting surface 221a of the mounting portion 221, the linear LED bar 26 is arranged so as to be inclined toward the composite reflective portion 222 and the reflective sheet 30.

With this arrangement, light emitted from the linear LED bar 26 is sequentially reflected from the composite reflective portion 222 and the reflective sheet 30 and propagates upward toward the display panel (not illustrated), more specifically, toward an upper opening of the rear case 10.

As mentioned above, the first reflective area 32 of the reflective sheet 30 is adjacent to the linear LED module 20 and its height gradually decreases along the widthwise direction from the linear LED module 20 to the base portion 31. The height of the second reflective area 33 of the reflective sheet 30 gradually increases with increasing distance from the base portion 31 and the linear LED module 20.

As mentioned above, the curved reflective surface 222a of the composite reflective portion 222 is formed adjacent to the mounting surface 221a and the straight reflective surface 222b of the composite reflective portion 222 extends a distance from the boundary with the curved reflective surface 222a in the direction away from the mounting portion 221. The linear LED bar 26 is mounted on the mounting surface 221a so as to be adjacent to the starting position of the curved reflective surface 222a.

As mentioned above, when the LEDs 262 provided in the linear LED bar 26 on the mounting surface 221a are adjacent to the boundary with the curved reflective surface 222a, the angle of incidence on the straight reflective surface 222b increases, and as a result, an increased amount of light reflected reaches one side edge of the reflective sheet 30 adjacent to the tip of the composite reflective portion 222. When light emitted from the LEDs 262 reaches a position closer to the tip of the straight reflective surface 222b in a state in which the LEDs 262 are arranged closest to the curved reflective surface 222a, the light is reflected and reaches one side edge of the reflective sheet 30 closer to the tip of the composite reflective portion 222.

Referring now to FIG. 6, as a result of comparing rays of light (a), (b), (c), and (d) reflected from the straight reflective surface 222b, the ray of light reaching a position closer to the tip of the straight reflective surface 222b, in other words, a position distant from the curved reflective surface 222a and the LEDs 262 and closest to the edge of the reflective sheet 30, is reflected in a direction close to the edge of the reflective sheet 30 and the ray of light reflected from the area close to the tip of the straight reflective surface 222b is relatively widely dispersed, contributing to a reduction in the amount of light reaching the edge of the reflective sheet 30. The rays of light (e) and (f) reflected from the curved reflective surface 222a adapted for uniform light reflection have are reflected in different patterns from the rays of light (a), (b), (c), and (d) reflected from the straight reflective surface 222b.

Unlike in the foregoing embodiment, LEDs may be arranged away from the curved reflective surface 222a in the embodiment illustrated in (g) of FIG. 6. In this case, a large amount of light is directed upward rather than toward the reflective sheet 30.

Although the above embodiments have described the backlight unit in which the linear LED module 20 is arranged adjacent to one side edge of the reflective sheet 30 but no linear LED module is present adjacent to the other side edge of the reflective sheet 30, a backlight unit can also be contemplated in which a pair of linear LED modules 20 facing each other are provided at both side edges of the reflective sheet 30. In this case, light can be more widely distributed toward a display panel without the need to provide additional elements, such as light diffusion patterns 305. In addition, the arrangement of a pair of linear LED modules facing each other is applicable to a display panel with a larger size. In this case, a reflective sheet having a cross-sectional profile other than the cross-sectional profile of the reflective sheet illustrated in FIG. 2 may be used. For example, there may be used a new form of reflective sheet including a combination of the cross-sectional profile of FIG. 2 and a cross-sectional profile mirror-symmetrical to the cross-sectional profile of FIG. 2.

What is claimed is:

1. A backlight unit comprising:
 a rear case arranged in rear of a display panel;
 a reflective sheet positioned in the rear of the display panel in the rear case; and
 a linear light emitting diode (LED) module comprising an LED bar and a linear reflector and arranged along one side edge of the reflective sheet,
 wherein the linear reflector comprises a mounting portion on which the LED bar is mounted along a lengthwise direction and a composite reflective portion integrated with the mounting portion and adapted to primarily reflect light emitted from the LED bar toward the reflective sheet,
 wherein a cross-section of the composite reflective portion comprises a curved reflective surface adjacent to the mounting portion and a straight reflective surface extending away from a boundary with the mounting portion,
 wherein the reflective sheet is adapted to secondarily reflect the light primarily reflected from the composite reflective portion toward the display panel,
 wherein the LED bar comprises a plurality of LEDs arrayed on a substrate in a lengthwise direction of the substrate, each of the LEDs having an optical axis,
 wherein the composite reflective portion is configured to intersect the optical axis,
 wherein the mounting portion comprises a mounting surface on which the LED bar is mounted,
 wherein the mounting surface is divided into an inner surface and an outer surface by a line drawn perpendicular to the mounting surface from the boundary between the curved reflective surface and the straight reflective surface, such that the inner surface is between a first end adjacent to the curved surface and the line and the outer surface is between the line and a second end opposite to the first end,
 wherein the LEDs lies in the inner surface,
 wherein the reflective sheet comprises one or more light attenuating areas formed around its one side edge adjacent to the linear LED module to increase the amount of light absorbed and reduce the amount of light reflected, and
 wherein a number of holes or black dot patterns are formed in the light attenuating areas.

2. The backlight unit according to claim 1, wherein the reflective sheet comprises a base portion having a lowest height in a widthwise direction and a first reflective area whose height gradually decreases along the widthwise direction from its one side edge adjacent to the linear LED module to the base portion.

3. The backlight unit according to claim 1, wherein the reflective sheet comprises a base portion having a lowest height in a widthwise direction and a second reflective area whose height gradually increases along the widthwise direction from the base portion to the other side edge distant from the linear LED module.

4. The backlight unit according to claim 3, wherein the second reflective area is formed as a reflective surface having a continuous curved profile with a positive (+) gradient.

5. The backlight unit according to claim 1, wherein the reflective sheet comprises a base portion having a lowest height in a widthwise direction, a first reflective area whose height gradually decreases along the widthwise direction from its one side edge adjacent to the linear LED module to the base portion, and a second reflective area whose height gradually increases along the widthwise direction from the base portion to the other side edge distant from the linear LED module; and
 wherein the first reflective area is formed as a reflective surface having a continuous curved profile with a negative (−) gradient; and the second reflective area is formed as a reflective surface having a continuous curved profile with a positive (+) gradient.

6. The backlight unit according to claim 5, wherein the second reflective area has a width larger than that of the first reflective area.

7. The backlight unit according to claim 1, wherein the one or more light attenuating areas comprise a first light attenuating area elongated along one side edge of the reflective sheet adjacent to the linear LED module and second and third light attenuating areas formed adjacent to the linear LED module at both sides of the reflective sheet in the widthwise direction.

8. The backlight unit according to claim 1, wherein one or more light diffusion patterns are formed in a central portion of the reflective sheet.

9. The backlight unit according to claim 1, further comprising a fixing clip provided on one side wall of the rear case and having a fitting groove in which the mounting portion is elastically fitted and held.

* * * * *